United States Patent Office 3,524,912
Patented Aug. 18, 1970

3,524,912
VETERINARY COUGH MEDICINE
Reginald George Withycombe, Alscot Park,
Stratford-on-Avon, Warwickshire, England
No Drawing. Filed Jan. 27, 1967, Ser. No. 612,082
Claims priority, application Great Britain, Feb. 25, 1966,
8,431/66
Int. Cl. A61k 27/00
U.S. Cl. 424—150                    2 Claims

ABSTRACT OF THE DISCLOSURE

The specification describes a veterinary cough medicine comprising sulphanilamide, iodine and an orally-ingestible carrier such as black treacle.

---

This invention relates to veterinary preparations and more particularly to a veterinary cough medicine for domestic and farm animals such as horses.

According to the present invention the medicine comprises an admixture of sulphanilamide, iodine and an inert, orally-ingestible, liquid pharmaceutical carrier.

Sulphanilamide is a member of the sulphonamide series of drugs and is also termed p-aminobenzenesulphonamide. It has a molecular weight of 172.21 and the formula:

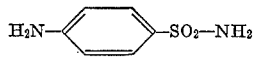

Sulphanilamide crystallises as colourless crystals or a creamy-white crystalline powder, melting point 164.5°–165.5° C. It is odourless and has a slightly bitter taste with a sweet after-taste. It is affected by light and should be stored in airtight containers, protected from light.

Sulphanilamide dissolves in water (very soluble in boiling water), alcohol and acetone. It is also soluble in glycerin, hydrochloric acid and solutions of potassium or sodium hydroxide. It is insoluble in chloroform, ether and benzene.

Sulphanilamide forms an acetyl derivative from which sulphanilamide can be formed by hydrolysing with hydrochloric acid to remove the acetyl group and then decomposing the resulting hydrochloride with alkali.

Purity standards for sulphanilamide are specified in many national pharmacopia, including the British Pharmaceutical Codex (B.P.C.) and the United States Pharmacopia (U.S.P.).

Iodine ($I_2$) is a non-metallic element in the seventh group of the periodic system, one of the halogens. It forms blackish scales with a violet lustre and a characteristic smell. Iodine has antiseptic properties.

Iodine is conveniently used in the form of a solution in water or alcohol, to which a soluble iodide such as potassium iodide may be added, to suppress ionisation. The British Pharmacoepia (B.P.) describes a solution of iodine (weak iodine solution B.P.) which I have found to be useful in the formulation of my veterinary cough mixture. Weak iodine solution B.P. consists of:

Iodine—25 g.
Potassium iodide—25 g.
Purified water [1]—25 ml.
Alcohol (90%)—to 1 litre

[1] Purified water is prepared from suitable potable water by distillation or by treatment with ion-exchange materials. Purity standards are prescribed in the British Pharmacoepia. However, for these present veterinary purposes ordinary distilled or de-ionised water may conveniently be substituted.

The weak iodine solution is made up by dissolving the potassium iodide and iodine in the water and then adding alcohol to make up one litre of solution. The solution has antiseptic properties.

The carrier is preferably one which is palatable to animals and I prefer to use a sweet-tasting, viscous, syrupy carrier such as black treacle. Black treacle is a product formed during sugar refining and is obtained from the molasses residue after the removal of the sugar crystals. It is a reddish-brown to black liquid of high viscosity which is miscible with water.

As mentioned above, I prefer to use the iodine in the form of a solution in water or alcohol to which iodide may be added, if desired, to suppress the ionisation of the iodine. I also prefer to dissolve the sulphanilamide in the iodine solution and then to mix this solution with the black treacle or other carrier.

The weight ratio of the sulphanilamide to the iodine is preferably about 3500:1, although the ratio may be higher or lower if desired. I prefer to use an iodine concentration of 1 in 12,000 parts by weight, based on the total weight of the medicine. The amount of the active substances in each dosage unit is preferably about 0.025 g. iodine and 75 g. sulphanilamide (sulphanilamide; iodine ratio of 3000:1) and at an iodine concentration of 1 in 12,000, this corresponds to a dose of about 0.3 kg. of medicine. Such a dosage unit should be administered at regular intervals until the symptoms are alleviated.

In order that the invention may be more fully understood, the following example is given by way of illustration only:

EXAMPLE

A cough medicine for horses was made up according to the following formulation:

Sulphanilamide B.P.C.—75 g.
Weak iodine solution B.P.—1 ml (equivalent to 0.025 g. $I_2$)
Black treacle—225 g.

The three ingredients were mixed throughly together and then administered to a horse with a cough. The medicine appeared to be palatable to the animal and apparently assisted in relieving the cough.

I claim:
1. A veterinary cough medicine which comprises a mixture of sulphanilamide, weak iodine solution B.P. and black treacle, the concentration of iodine in the mixture being about 1 in 12,000 parts by weight and the weight ratio of sulphanilamide to iodine in the mixture being about 3000:1.

2. A veterinary medicine which consists essentially of the following ingredients in the following proportions by weight:

(i) Sulphanilamide—about 3000 parts by weight
(ii) Iodine—about 1 part by weight,
(iii) Potassium iodide—about 1 part by weight,
(iv) Water—about 1 part by weight,
(iv) Black treacle—about 9000 parts by weight.

References Cited

UNITED STATES PATENTS
3,035,972   5/1962   Spoor et al.

OTHER REFERENCES

Merck Index, 7th ed., (1960), p. 996.
Modern Drugs, March 1957, p. 1179.
Pereira, The Elements of Materia Medica and Therapeutics, (1854), pp. 149–153.

STANLEY J. FRIEDMAN, Primary Examiner

U.S. Cl. X.R.

424—228